US012596361B2

(12) United States Patent
Higashino

(10) Patent No.: US 12,596,361 B2
(45) Date of Patent: Apr. 7, 2026

(54) FAILURE DIAGNOSIS METHOD, METHOD OF MANUFACTURING DISK DEVICE, AND RECORDING MEDIUM

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Yoshinari Higashino, Chigasaki Kanagawa (JP)

(73) Assignees: KABUSHIKI KAISHA TOSHIBA, Kawasaki (JP); TOSHIBA ELECTRONIC DEVICES & STORAGE CORPORATION, Kawasaki (JP)

( * ) Notice: Subject to any disclaimer, the term of this patent is extended or adjusted under 35 U.S.C. 154(b) by 475 days.

(21) Appl. No.: 18/181,087

(22) Filed: Mar. 9, 2023

(65) Prior Publication Data

US 2024/0094719 A1 Mar. 21, 2024

(30) Foreign Application Priority Data

Sep. 20, 2022 (JP) ................................. 2022-149362

(51) Int. Cl.
*G05B 23/02* (2006.01)
*G11B 20/18* (2006.01)

(52) U.S. Cl.
CPC .......... *G05B 23/0221* (2013.01); *G11B 20/18* (2013.01); *G11B 2220/20* (2013.01)

(58) Field of Classification Search
CPC ............ G05B 23/0221; G05B 23/0235; G11B 20/18; G11B 2220/20; G11B 7/00375; G11B 19/04; G11B 19/26; G11B 20/10009; G11B 20/10296; G11B 20/14; G11B 20/1816; G11B 2020/10981; G11B 7/00456; G11B 7/00458; G11B 7/0079; G11B 7/0948; G11B 7/268
See application file for complete search history.

(56) References Cited

U.S. PATENT DOCUMENTS

| | | | |
|---|---|---|---|
| 5,668,679 A | 9/1997 | Swearingen et al. | |
| 6,751,041 B1 | 6/2004 | Codilian et al. | |
| 7,200,074 B2 * | 4/2007 | Kano ................... | G06F 3/0689 |
| | | | 369/30.58 |
| 8,009,381 B2 | 8/2011 | Katsumura et al. | |
| 8,531,931 B2 * | 9/2013 | Kubo ................. | G11B 7/00375 |
| | | | 369/53.35 |
| 9,076,472 B1 | 7/2015 | Sherman et al. | |
| | (Continued) | | |

*Primary Examiner* — Mohammad K Islam
(74) *Attorney, Agent, or Firm* — Knobbe, Martens, Olson & Bear, LLP

(57) ABSTRACT

According to an embodiment, there is provided a failure diagnosis method. The failure diagnosis method includes installing a disk device in a manufacturing rack. The failure diagnosis method acquiring, by the disk device, data on a state of a predetermined constituent unit in the manufacturing rack with the disk device being installed in the manufacturing rack. The failure diagnosis method includes determining, by the disk device, whether or not the state of the predetermined constituent unit falls within an allowable range by using the data acquired.

19 Claims, 9 Drawing Sheets

(56) References Cited

U.S. PATENT DOCUMENTS

| | | | |
|---|---|---|---|
| 2012/0151262 A1* | 6/2012 | Nakayama | G11B 19/047 |
| | | | 714/22 |
| 2017/0047086 A1* | 2/2017 | Usui | G11B 5/40 |
| 2021/0090598 A1* | 3/2021 | Yoshida | G11B 5/59694 |

* cited by examiner

FIG.6

| | MAXIMUM [V] | MINIMUM [V] | NG DETERMINATION SLICE | DETERMINATION |
|---|---|---|---|---|
| PL_1 | 5.06 | 4.95 | 4.75 OR LESS or 5.25 V OR MORE | OK |
| PL_2 | 5.58 | 4.93 | 4.75 OR LESS or 5.25 V OR MORE | NG |
| PL_3 | 5.10 | 4.97 | 4.75 OR LESS or 5.25 V OR MORE | OK |
| PL_4 | 5.09 | 4.96 | 4.75 OR LESS or 5.25 V OR MORE | OK |

FIG.8

| | MIN-MIN [COUNT] | MAX-MAX [COUNT] | NG DETERMINATION SLICE | DETERMINATION |
|---|---|---|---|---|
| PL_1 | -1201 | 2092 | -2500 OR LESS or 2500 OR MORE | OK |
| PL_2 | -2231 | 2905 | -2500 OR LESS or 2500 OR MORE | NG |
| PL_3 | -1201 | 1852 | -2500 OR LESS or 2500 OR MORE | OK |
| PL_4 | -1191 | 1659 | -2500 OR LESS or 2500 OR MORE | OK |

FAILURE DIAGNOSIS METHOD, METHOD OF MANUFACTURING DISK DEVICE, AND RECORDING MEDIUM

CROSS-REFERENCE TO RELATED APPLICATIONS

This application is based upon and claims the benefit of Japanese Patent Application No. 2022-149362, filed on Sep. 20, 2022 the entire contents of which are incorporated herein by reference.

FIELD

Embodiments described herein relate generally to a failure diagnosis method, a method of manufacturing a disk device, and a recording medium.

BACKGROUND

In a manufacturing rack, a disk device having a disk is installed. Some auxiliary servo patterns are written on the disk. Some servo patterns corresponding to the auxiliary servo patterns are written on the disk. Then, the disk device is manufactured. In the case, it is desirable that the disk device is appropriately manufactured.

BRIEF DESCRIPTION OF THE DRAWINGS

FIG. 6 illustrates a determination result of the power supply level in the embodiment;

FIG. 8 illustrates a determination result of the rotation period of the spindle motor in the embodiment.

DETAILED DESCRIPTION

In general, according to one embodiment, there is provided a failure diagnosis method. The failure diagnosis method includes installing a disk device in a manufacturing rack. The failure diagnosis method acquiring, by the disk device, data on a state of a predetermined constituent unit in the manufacturing rack with the disk device being installed in the manufacturing rack. The failure diagnosis method includes determining, by the disk device, whether or not the state of the predetermined constituent unit falls within an allowable range by using the data acquired.

Exemplary embodiments of a failure diagnosis method will be explained below in detail with reference to the accompanying drawings. The present invention is not limited to the following embodiments.

(Embodiment)

The failure diagnosis method according to the embodiment is applied to a manufacturing rack for manufacturing a disk device. In the manufacturing rack, a blank disk self-servo write (BDSSW) manufacturing process is implemented. In the BDSSW manufacturing process, a disk device having a disk is installed in a manufacturing rack. Some auxiliary servo patterns are written on the disk. Some servo patterns corresponding to the auxiliary servo patterns are written on the disk. Then, the disk device is manufactured. It is noted that the number of auxiliary servo patterns may be arbitrary and may be one within the scope of the spirit of this embodiment. It is also noted that the number of servo patterns may be arbitrary and may be one within the scope of the spirit of this embodiment.

The failure diagnosis method aims to appropriately manufacture the disk device in the manufacturing rack by diagnosing a failure of a predetermined constituent unit in the manufacturing rack before manufacturing the disk device in the manufacturing rack.

Figure 1:
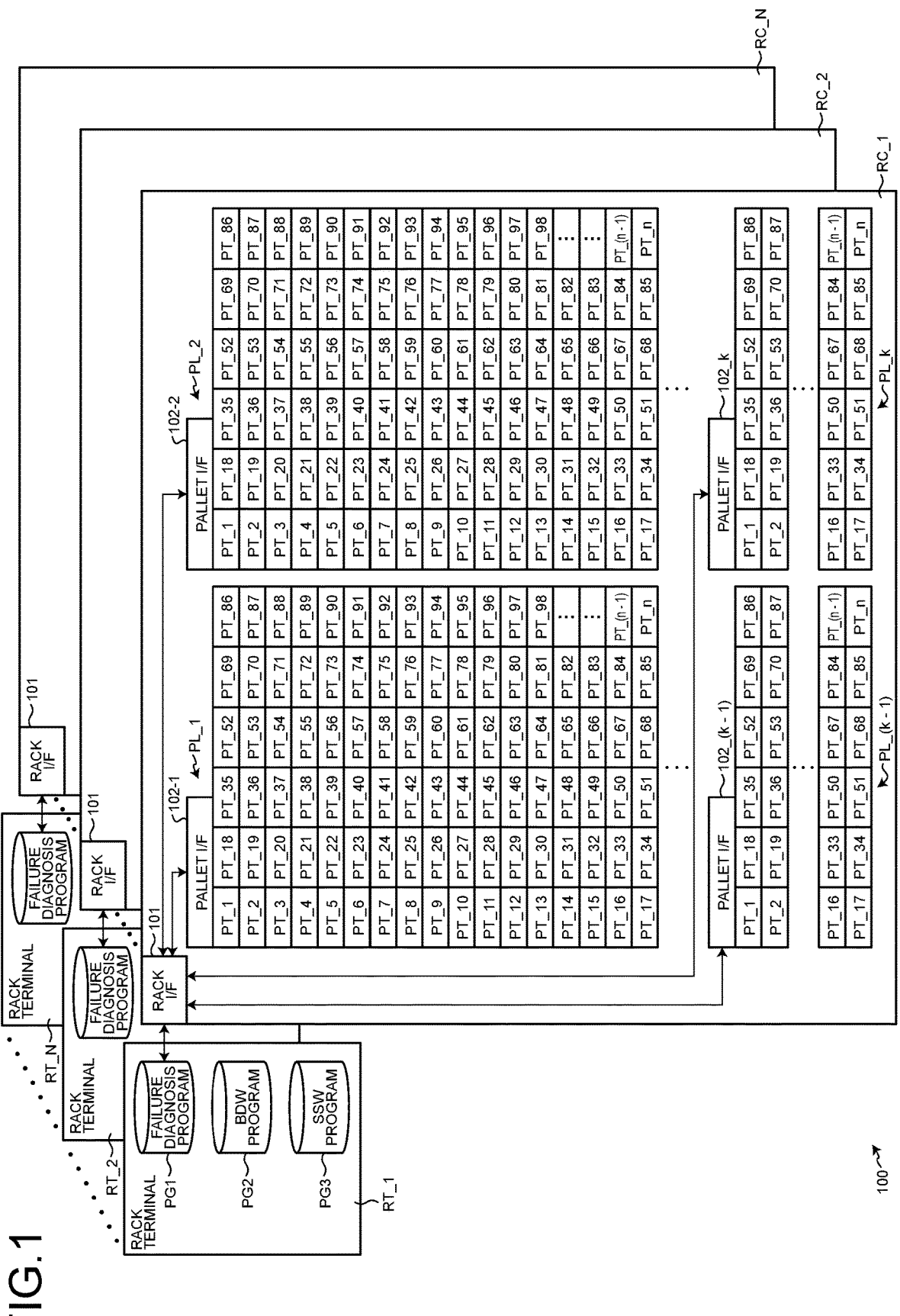
FIG. 1 illustrates a disk device manufacturing system according to an embodiment.

As illustrated in FIG. 1, a disk device manufacturing system 100 includes N manufacturing racks RC_1 to RC_N and N rack terminals RT_1 to RT_N. FIG. 1 illustrates the disk device manufacturing system 100. N is an integer of two or more. N=100 may be established.

The N manufacturing racks RC_1 to RC_N correspond to the N rack terminals RT_1 to RT_N. Each of the manufacturing racks RC_1 to RC_N is connected to a corresponding rack terminal RT via a communication medium. The communication medium may be a wired communication path for serial communication. Each rack terminal RT stores a failure diagnosis program PG1, a blank disk write (BDW) program PG2, and a self-servo write (SSW) program PG3 in a storage.

Each manufacturing rack RC includes a rack interface (rack I/F) 101 and plural pallets PL_1 to PL_k. Here, k is an integer of two or more. In addition, k=6 may be established.

The rack interface 101 is connected to the rack terminal RT via the communication medium, and connected to the plurality of pallets PL_1 to PL_k via bus wiring. The rack interface 101 performs an interface operation between the rack terminal RT and the plurality of pallets PL_1 to PL_k. For example, the rack interface 101 receives the failure diagnosis program PG1 from the rack terminal RT via the communication medium. The rack interface 101 functions as a selector that sequentially selects and connects the rack terminal RT to the plurality of pallets PL_1 to PL_k. The rack interface 101 sequentially supplies the failure diagnosis program PG1 to the plurality of pallets PL_1 to PL_k.

Each of the pallets PL_1 to PL_k includes a pallet interface (pallet I/F) 102 and plural ports PT_1 to PT_n. Here, n is an integer of two or more. In addition, n=102 may be established.

The pallet interface 102 performs an interface operation between the rack interface 101 and the plurality of ports PT_1 to PT_n. For example, the pallet interface 102 receives the failure diagnosis program PG1 from the rack interface 101 via bus wiring. The pallet interface 102 functions as a selector that sequentially selects and connects the rack interface 101 to the plurality of ports PT_1 to PT_n. The pallet interface 102 sequentially supplies the failure diagnosis program PG1 to the plurality of ports PT_1 to PT_n.

Figure 2:
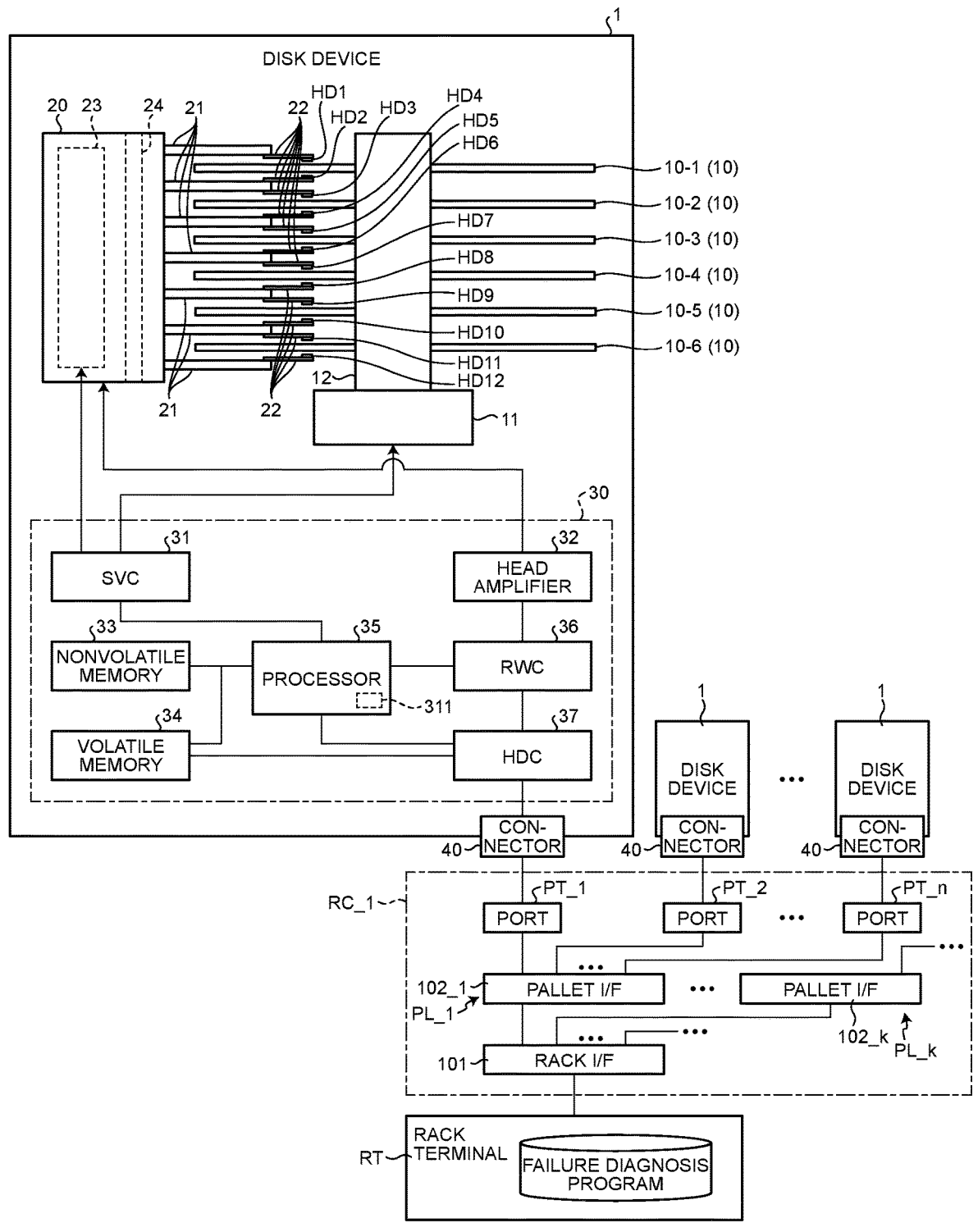
FIG. 2 illustrates a configuration of a disk device according to the embodiment.

As illustrated in FIG. 2, each port PL is connected to a connector 40 of a disk device 1. FIG. 2 illustrates a configuration of the disk device 1.

The disk device 1 is connected to the port PT in the manufacturing process while the disk device 1 can be connected to a host 2 after completion of the manufacturing process. The standard of a communication path between the disk device 1 and the host 2 is not limited to a specific standard. In one example, serial advanced technology attachment (SATA) or serial attached SCSI (SAS) can be adopted. The connector 40 may include a SATA connector or a universal asynchronous receiver/transmitter (UART) connector. The disk device 1 functions as a storage medium of the host 2. The disk device 1 is, for example, a disk-type storage medium such as a hard disk drive (HDD) and an optical disk drive.

For example, a processor, a personal computer, and a server correspond to the host 2. The disk device 1 can receive an access command (read command and write command) from the host 2.

The disk device 1 includes plural disks 10 that rotate about a rotation shaft 12 of a spindle motor (SPM) 11. Here, in one example, the disk device 1 includes six disks 10-1, 10-2, 10-3, 10-4, 10-5, and 10-6. The six disks 10-1, 10-2, 10-3, 10-4, 10-5, and 10-6 are integrally rotated by the SPM 11.

The disk 10 is a substantially disk-shaped medium on which information is to be recorded. The disk 10 may be a magnetic disk or a magneto-optical disk. When the disk 10 is a magnetic disk, recording surfaces capable of recording data are formed on the front surfaces and the back surfaces of the six disks 10. That is, the six disks 10 have twelve recording surfaces. In order to access each of the twelve recording surfaces, the disk device 1 includes twelve heads HD1 to HD12 corresponding to the twelve recording surfaces.

The head HD1 is provided so as to face the front surface of the disk 10-1. The head HD2 is provided so as to face the back surface of the disk 10-1. The head HD3 is provided so as to face the front surface of the disk 10-2. The head HD4 is provided so as to face the back surface of the disk 10-2. The head HD5 is provided so as to face the front surface of the disk 10-3. The head HD6 is provided so as to face the back surface of the disk 10-3. The head HD7 is provided so as to face the front surface of the disk 10-4. The head HD8 is provided so as to face the back surface of the disk 10-4. The head HD9 is provided so as to face the front surface of the disk 10-5. The head HD10 is provided so as to face the back surface of the disk 10-5. The head HD11 is provided so as to face the front surface of the disk 10-6. The head HD12 is provided so as to face the back surface of the disk 10-6.

Hereinafter, the twelve heads HD1 to HD12 may be collectively referred to as heads HD. Each head HD can access, that is, write data and read data to and from a recording surface provided on a surface, facing each head HD itself, of each of the six disks 10.

The disk device 1 includes an actuator system 20 that integrally moves the twelve heads HD. The actuator system 20 includes seven actuator arms 21, twelve suspensions 22, and a voice coil motor (VCM) 23. Each of the twelve suspensions 22 of the actuator system 20 supports any one of the heads HD1 to HD12. Each of the twelve suspensions 22 of the actuator system 20 is attached to a distal end of any one of the seven actuator arms 21.

The actuator system 20 can rotate about a rotation shaft 24. The rotation shaft 24 is provided at a position parallel to the rotation shaft 12 and separated from the rotation shaft 12. The VCM 23 can rotate the actuator system 20 within a predetermined range about the rotation shaft 24. Therefore, the actuator system 20 can radially move the heads HD1 to HD12 relatively to the recording surfaces of the disks 10-1 to 10-6.

The disk device 1 further includes a servo controller 31, a head amplifier 32, a nonvolatile memory 33, a volatile memory 34, a processor 35, a read/write channel (RWC) 36, and a hard disk controller (HDC) 37.

The head amplifier 32 supplies a signal corresponding to write data input from the RWC 36 to the head HD facing a recording surface to which something is to be written. Furthermore, the head amplifier 32 amplifies a signal output from the head HD facing a recording surface from which something is to be read, and supplies the signal to the RWC 36.

The nonvolatile memory 33 includes, for example, a nonvolatile memory such as a flash memory. A program executed by the processor 35 is recorded in the nonvolatile memory 33. In the manufacturing process of the disk device 1, the program executed by the processor 35 includes the failure diagnosis program PG1, the BDW program PG2, and the SSW program PG3. After completion of the manufacturing process of the disk device 1, the program executed by the processor 35 includes firmware for normal operation.

The volatile memory 34 includes a volatile memory such as a dynamic random access memory (DRAM) and a static random access memory (SRAM). The volatile memory 34 is provided with an area for buffering write data that has been received from the host 2 and that has not been written in the disks 10 yet and read data that has been read from the disks 10 and that has not sent to the host 2 yet.

The RWC 36 modulates write data buffered in the volatile memory 34, and outputs the write data to the head amplifier 32. Furthermore, the RWC 36 demodulates the signal supplied from the head amplifier 32, and outputs the signal to the HDC 37.

In the manufacturing process of the disk device 1, the HDC 37 is a communication interface that enables communication with the port PT. Specifically, when receiving the failure diagnosis program PG1 from the rack terminal RT via the rack I/F 101, the pallet I/F 102, and the port PT, the HDC 37 stores the failure diagnosis program PG1 in the nonvolatile memory 33. When failure diagnosis processing ends, the HDC 37 returns a failure diagnosis result to the rack terminal RT via the port PT, the pallet I/F 102, and the rack I/F 101.

After completion of the manufacturing process of the disk device 1, the HDC 37 is a communication interface that enables communication with the host 2. Specifically, when receiving a write command from the host 2, the HDC 37 stores the write data in the volatile memory 34. When write of the write data to the disks 10 ends, the HDC 37 respond to the host 2. Furthermore, when receiving a read command from the host 2, the HDC 37 returns data requested to be read by the read command (read data) buffered in the volatile memory 34 to the host 2 after the read data is read by the disks 10 and buffered in the volatile memory 34.

The servo controller (SVC) 31 supplies a control signal to the SPM 11, and rotates the SPM 11 at a predetermined frequency and phase. The control signal may be a control current or a control voltage.

Furthermore, the SVC 31 drives the VCM 23 for moving the head HD to a position designated by the processor 35.

The processor 35 is, for example, a central processing unit (CPU). The processor 35 executes various pieces of processing by using a program stored in the nonvolatile memory 33 or a nonvolatile storage medium such as the disks 10.

For example, the processor 35 executes control of data write and data read using the head HD, processing of determining an access position on the recording surface of the disk 10, processing of giving an instruction on the access position to the servo controller 31.

Furthermore, the processor 35 includes a phase locked loop (PLL) processing unit 311. The PLL processing unit 311 is used to generate a PLL clock synchronized with the rotation period of the SPM 11. The PLL clock is a reference clock of a write clock when a spiral pattern SP is written. Therefore, when the rotation period of the SPM 11 is not stable, the jitter included in the write clock increases, and the quality of the spiral pattern SP decreases.

The servo controller 31, the head amplifier 32, the nonvolatile memory 33, the volatile memory 34, the processor 35, the RWC 36, and the HDC 37 constitute a controller 30. Note that the components of the controller 30 are not limited thereto.

Figure 3:
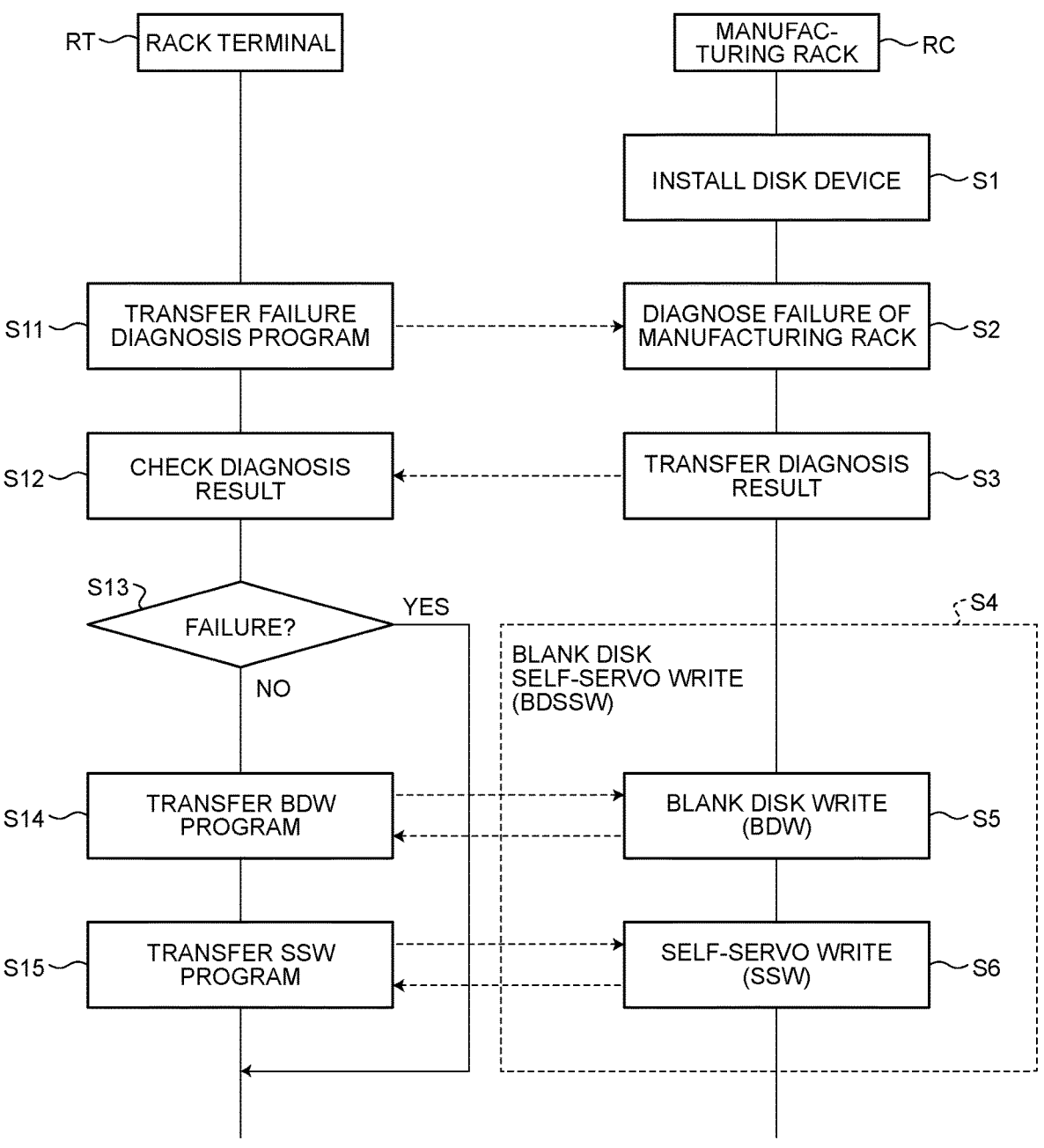
FIG. 3 is a flowchart illustrating a flow of manufacturing the disk device according to the embodiment.

Next, a flow of manufacturing the disk device 1 will be described with reference to FIG. 3. FIG. 3 is a flowchart illustrating a flow of manufacturing the disk device 1. Although, in FIG. 3, operations of one rack terminal RT and one manufacturing rack RC connected thereto will be mainly described, the same applies to operations of another rack terminal RT and another manufacturing rack RC connected thereto, In the manufacturing rack RC, the disk device 1 is installed in each of the ports PT_1 to PT_n of each of the pallets PL_1 to PL_k (S1). That is, the connector 40 of the disk device 1 is connected to each of the ports PT_1 to PT_n of each of the pallets PL_1 to PL_k of the manufacturing rack RC.

When recognizing that the installation of the disk device 1 is completed by establishing communication with each disk device 1, the rack terminal RT reads the failure diagnosis program PG1 from the storage. The rack terminal RT sequentially transfers the failure diagnosis program PG1 to each disk device 1 via the communication medium, the rack I/F 101, the pallet I/F 102, and the port PT (S11).

In the manufacturing rack RC, when receiving the failure diagnosis program PG1, each disk device 1 stores the failure diagnosis program PG1 in the nonvolatile memory 33. Each disk device 1 executes the failure diagnosis program PG1, and diagnoses a failure of the manufacturing rack RC (S2).

Each disk device 1 acquires a parameter related to the state of a predetermined constituent unit in the manufacturing rack. The predetermined constituent unit is a target of failure diagnosis, and may be the manufacturing rack RC, the pallet PL, or the port PT. Each disk device 1 determines whether or not the state of the predetermined constituent unit falls within the allowable range by using the acquired parameter. When the state of the predetermined constituent unit is out of the allowable range, each disk device 1 diagnoses that the predetermined constituent unit has failed. When the state of the predetermined constituent unit falls within the allowable range, each disk device 1 diagnoses that the predetermined constituent unit has not failed.

Figure 4:
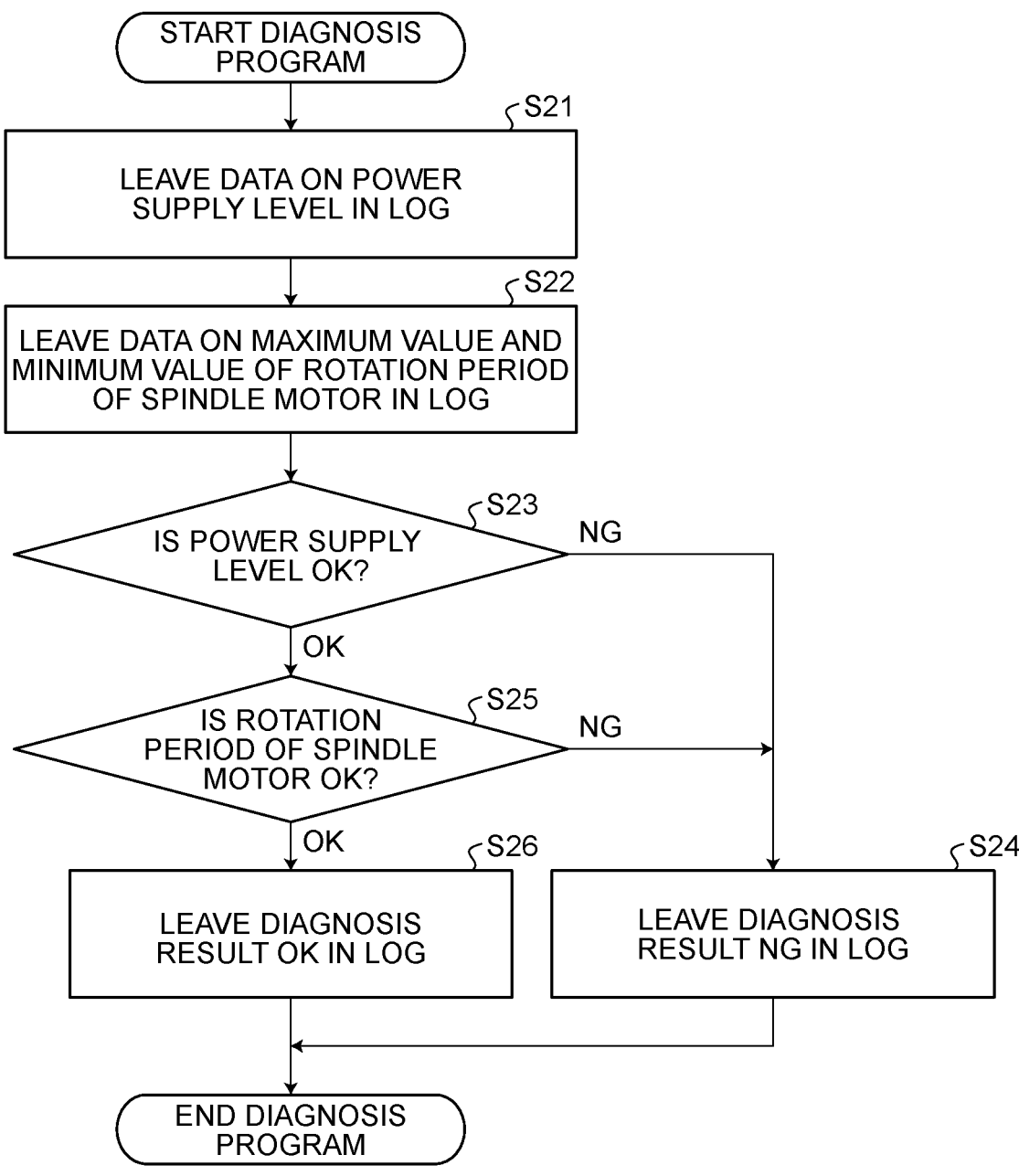
FIG. 4 is a flowchart illustrating a flow of failure diagnosis in the embodiment.

For example, each disk device 1 performs an operation as illustrated in FIG. 4. FIG. 4 is a flowchart illustrating a flow of the failure diagnosis.

In each disk device 1, the controller 30 checks a level of power supply from the manufacturing rack RC to the SVC 31, and leaves data on the power supply level in a log in accordance with the failure diagnosis program PG1 (S21). The power supply level refers to a level of a power supply voltage. The appropriate power supply level may be 5 V. The log is information related to an operation history of the disk device 1.

The controller 30 checks the rotation period of the SPM 11 monitored by the SVC 31, and leaves data on the maximum value/minimum value of the rotation period of the SPM 11 in a log in accordance with the failure diagnosis program PG1 (S22).

The controller 30 determines whether or not the power supply level is appropriate in accordance with the failure diagnosis program PG1 (S23).

Figure 5:
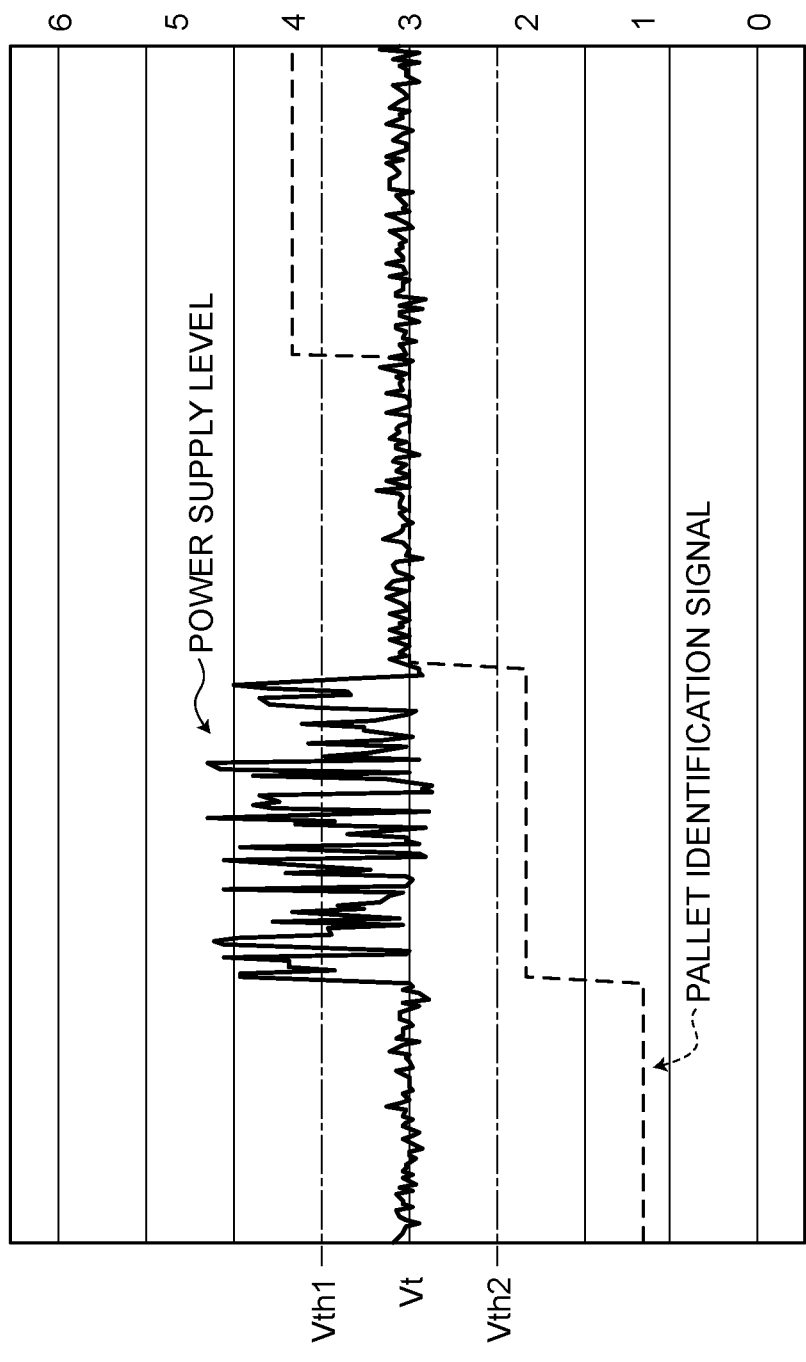
FIG. 5 illustrates data on a power supply level in the embodiment.

Whether or not the power supply level is within an appropriate range can be determined by, for example, an NG determination slice of the power supply level as illustrated in FIG. 5. The appropriate range determined by the NG determination slice of the power supply level may be referred to as an allowable range of the power supply level. NG determination slice may be defined as allowable range of a parameter. FIG. 5 illustrates data on the power supply level. FIG. 5 illustrates a result of sequentially scanning pieces of data of the ports PT_1 to PT_n of the pallets PL_1 to PL_4. In a solid line graph of FIG. 5, the vertical axis represents a power supply level, and the horizontal axis represents a pallet identifier and a port identifier. In a dotted line graph, the vertical axis represents a value of a pallet identification signal.

The NG determination slice includes a target value Vt, and may be specified as a range between an upper limit Vth1 and a lower limit Vth2. FIG. 5 illustrates power supply levels of all the ports PT_1 to PT_n in each of the pallets PL_1, PL_2, PL_3, and PL_4. An example of FIG. 5 indicates that the maximum value of the power supply level is out of the NG determination slice beyond the upper limit Vth1 in some ports PT of the pallet PL_2 among the pallets PL_1, PL_2, PL_3, and PL_4.

For example, FIG. 6 illustrates a numerical example in a case where the target value Vt of the power supply level=5 V, the upper limit Vth1 of the NG determination slice=5.25 V, and the lower limit Vth2=4.75 V. In the case of FIG. 6, the maximum value "5.58" of the power supply level of the pallet PL_2 is out of the NG determination slice beyond the upper limit "5.25". The respective maximum values "5.06", "5.10", and "5.09" of the power supply levels of the pallets PL_1, PL_3, and PL_4 fall within the NG determination slice. The respective minimum values "4.95", "4.93", "4.97", and "4.96" of the power supply levels of the pallets PL_1, PL_2, PL_3, and PL_4 fall within the NG determination slice. In response to this, the controller 30 determines the pallet PL_2 as "NG", and determines the other pallets PL_1, PL_3, and PL_4 as "OK".

For the predetermined constituent unit, if the power supply level is not appropriate (NG in S23), the controller 30 leaves information indicating that the port PT to be diagnosed is NG in a log (S24). The controller 30 makes an update by adding information indicating that the port PT to be diagnosed is NG in the log together with identification information of the pallet PL. In the examples of FIGS. 5 and 6, the information indicating that the pallet PL_2 is NG is added to the log.

For a diagnosis target (predetermined constituent unit), if the power supply level is appropriate (OK in S23), the controller 30 determines whether or not the rotation period of the SPM 11 is appropriate for the diagnosis target in accordance with the failure diagnosis program PG1 (S25).

Figure 7:
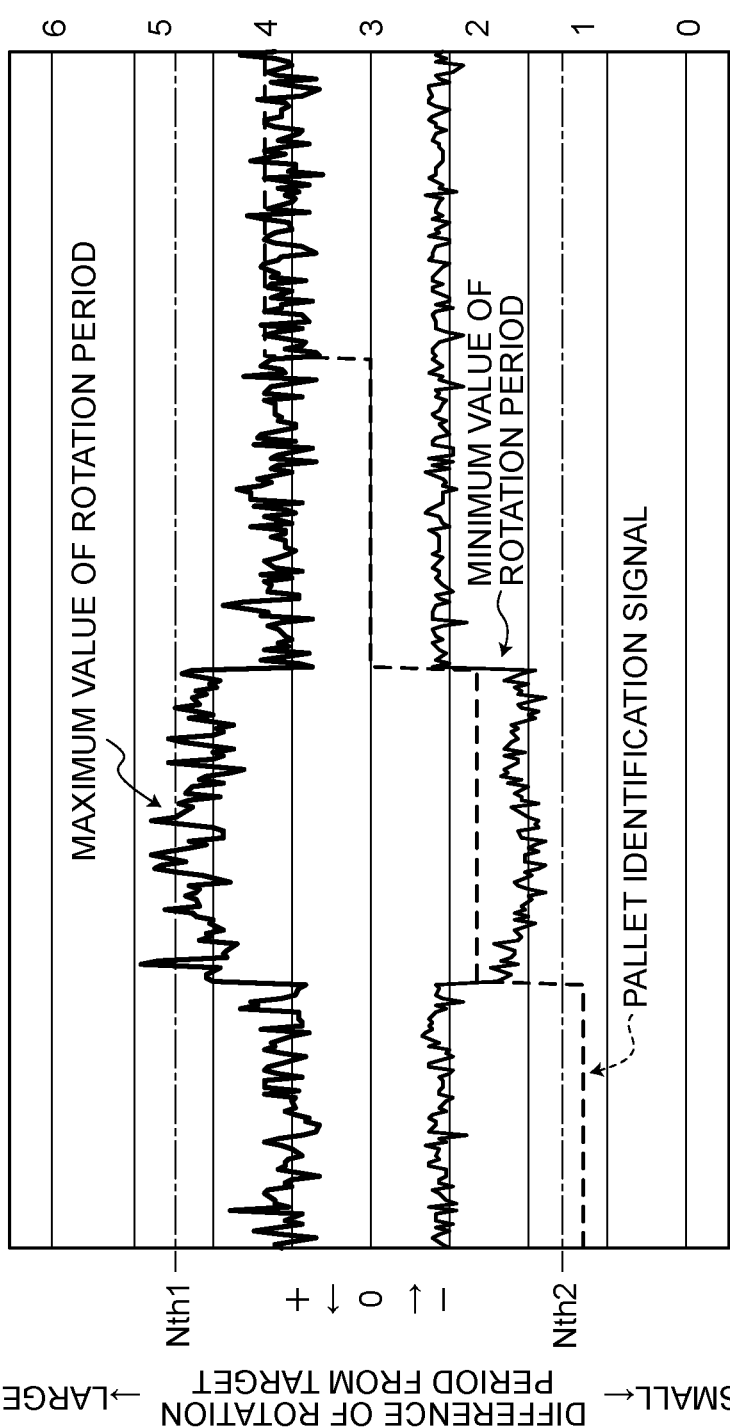
FIG. 7 illustrates data on a rotation period of a spindle motor in the embodiment.

In a diagnosis result, whether or not the rotation period of the SPM 11 is within the appropriate range can be determined by the NG determination slice of the rotation period of the SPM 11 as illustrated in FIG. 7, for example. The appropriate range determined by NG determination slice of rotation period of the SPM 11 may be referred to as an allowable range of rotation period of the SPM 11. FIG. 7 illustrates data on the rotation period of the SPM 11. The controller 30 makes a measurement by defining a time of one rotation of the SPM 11 as a time of one rotation of an index (reference rotation position). The controller 30 measures the time of one rotation of the SPM 11 by counting the clock number of high frequency clocks (PLL clocks) at the timing of synchronization with the index (reference rotation position). The controller 30 monitors a difference between a count value of each one-rotation time and a count value of a one-rotation target time (difference of rotation period from target) as data on the rotation period of the SPM 11. Unstable rotation period of the SPM 11 increases the variation in the monitored value of the difference of the rotation period from the target. FIG. 7 illustrates a result of sequentially scanning pieces of data of the ports PT_1 to PT_n of the pallets PL_1 to PL_4. In a solid line graph of FIG. 7, the vertical axis represents the difference of the rotation period from the target, and the horizontal axis represents a pallet identifier and a port identifier. In a dotted line graph, the vertical axis represents a value of a pallet identification signal.

The NG determination slice may be defined as a range between an upper limit Nth1 and a lower limit Nth2. FIG. 7 illustrates the maximum value and the minimum value of the rotation periods of the SPM 11 of all the ports PT_1 to PT_n in the pallets PL_1, PL_2, PL_3, and PL_4. An example of FIG. 7 indicates that the maximum value of the rotation period of the SPM 11 is out of the NG determination slice beyond the upper limit Nth1 in some ports PT of the pallet PL_2 among the pallets PL_1, PL_2, PL_3, and PL_4.

For example, FIG. 8 illustrates a numerical example in a case where the upper limit Nth1=2500 and the lower limit Nth2=−2500 of the NG determination slice are established. In the case of FIG. 8, the maximum value "2905" of the rotation period of the SPM 11 of the pallet PL_2 is out of the NG determination slice beyond the upper limit "2500". The respective maximum values "2092", "1852", and "1659" of the rotation period of the SPM 11 of the pallets PL_1, PL_3, and PL_4 fall within the NG determination slice. The respective minimum values "−1201", "−2231", "−1201", and "−1191" of the rotation period of the SPM 11 of the pallets PL_1, PL_2, PL_3, and PL_4 fall within the NG determination slice. In response to this, the controller 30 determines the pallet PL_2 as "NG", and determines the other pallets PL_1, PL_3, and PL_4 as "OK".

For the predetermined constituent unit, if the rotation period of the SPM 11 is not appropriate (NG in S25), the controller 30 leaves information indicating that the pallet PL to be diagnosed is NG in a log (S24).

For a diagnosis target (predetermined constituent unit), if the power supply level is appropriate (OK in S25), the controller 30 leaves information indicating that the pallet PL to be diagnosed is OK in a log (S26). The controller 30 makes an update by adding information indicating that the pallet PL to be diagnosed is OK in the log together with identification information of the pallet PL. In the examples of FIGS. 7 and 8, the information indicating that the pallets PL_1, PL_3, and PL_4 are OK is added to the log.

Returning to FIG. 3, when the diagnosis of a failure of the manufacturing rack RC is completed, each disk device 1 transfers the diagnosis result to the rack terminal RT via the port PT, the pallet I/F 102, the rack I/F 101, and the communication medium (S3). The diagnosis result indicates OK or NG. OK indicates that no abnormality has been detected in the failure diagnosis. NG indicates that at least one failure has been detected in the failure diagnosis.

When receiving the diagnosis result from each disk device 1, the rack terminal RT checks the diagnosis result (S12). The rack terminal RT checks the diagnosis result for each predetermined constituent unit. The diagnosis result includes a diagnosis result of the power supply level and a diagnosis result of the rotation period of the SPM 11.

For example, when the predetermined constituent unit is the pallet PL, the rack terminal RT checks OK/NG for each pallet PL.

The rack terminal RT makes a diagnosis (final failure diagnosis) of whether or not the predetermined constituent unit has a failure in accordance with a check result in S12 (S13).

In relation to the diagnosis result of the power supply level, the rack terminal RT may check whether or not the maximum value/minimum value of the power supply levels of all the ports PT fall within the NG determination slice (i.e., whether or not diagnosis result is OK) for each pallet PL.

In relation to the diagnosis result of the rotation period of the SPM 11, the rack terminal RT may determine whether or not the maximum value/minimum value of the rotation periods of the SPM 11 of all the ports PT fall within the NG determination slice (i.e., whether or not diagnosis result is OK) for each pallet PL.

If the diagnosis result from the disk device 1 of the predetermined constituent unit in the manufacturing rack RC is OK, the rack terminal RT determines that the predetermined constituent unit does not have a failure (No in S13). The rack terminal RT reads the BDW program PG2 from the storage. The rack terminal RT sequentially transfers the BDW program PG2 to each disk device 1 of the predetermined constituent unit via the communication medium, the rack I/F 101, the pallet I/F 102, and the port PT (S14).

Figure 9A:
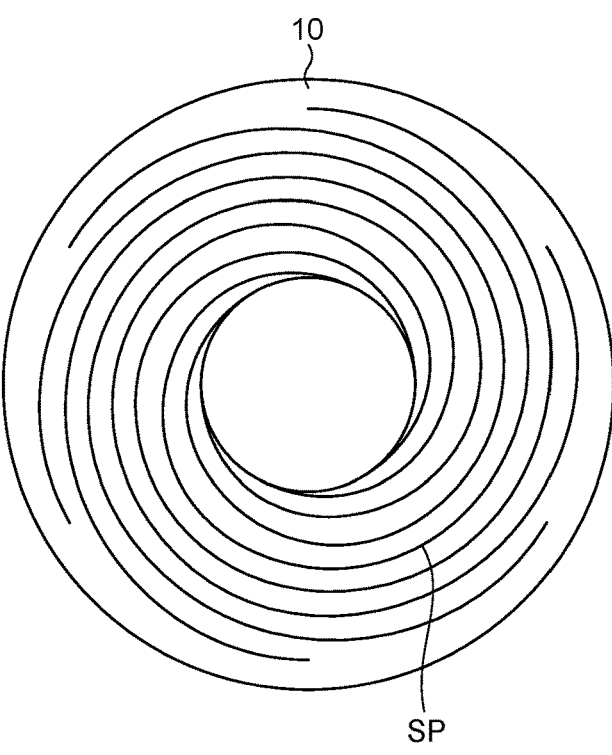
FIGS. 9A and 9B illustrate some auxiliary servo patterns and some servo patterns written on a disk in the embodiment.

When receiving the BDW program PG2, each disk device 1 of the predetermined constituent unit stores the BDW program PG2 in the nonvolatile memory 33. Each disk device 1 executes the BDW program PG2, and performs blank disk write (BDW) (S5). Each disk device 1 receives power supply from the manufacturing rack RC, rotates the disk 10 with the SPM 11, and writes some auxiliary servo patterns on the disk 10 in accordance with the BDW program PG2. That is, as illustrated in FIG. 9A, each disk device 1 each disk device 1 writes the spiral pattern SP extending in a spiral shape inclined from the radial direction of the blank disk 10. When the BDW is completed, each disk device 1 transfers a BDW completion notification to the rack terminal RT via the port PT, the pallet I/F 102, the rack I/F 101, and the communication medium.

When receiving the BDW completion notification from each disk device 1 of the predetermined constituent unit, the rack terminal RT reads the SSW program PG3 from the storage, and sequentially transfers the SSW program PG3 to each disk device 1 via the communication medium, the rack I/F 101, the pallet I/F 102, and the port PT (S15).

Figure 9B:
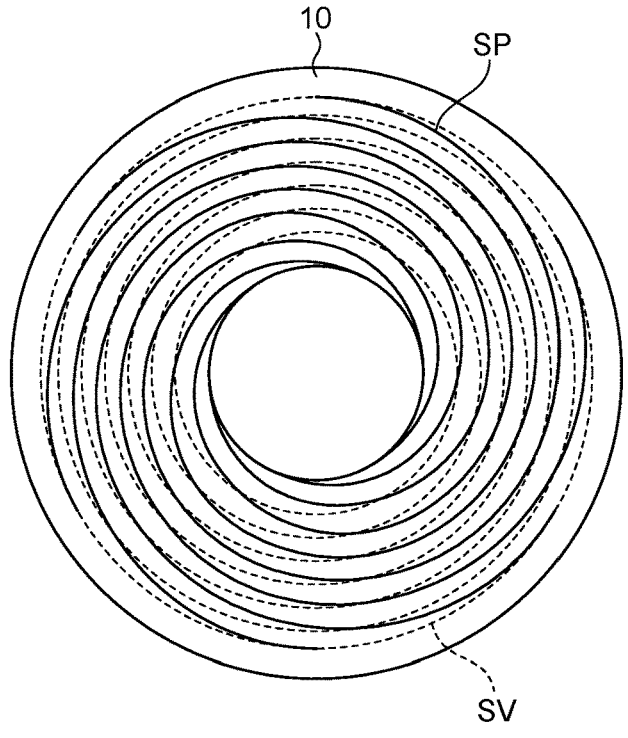

When receiving the SSW program PG3, each disk device 1 of the predetermined constituent unit stores the SSW program PG3 in the nonvolatile memory 33. Each disk device 1 executes the SSW program PG3, and performs self-servo write (SSW) (S6). Each disk device 1 receives power supply from the manufacturing rack RC, rotates the disk 10 with the SPM 11, and writes some servo patterns corresponding to the auxiliary servo patterns on the disk 10 in accordance with the SSW program PG3. That is, as indicated by a dotted line in FIG. 9B, each disk device 1 writes some servo patterns SV concentrically distributed on the disk 10 while controlling the positioning of the head 22 by using the spiral patterns SP. When the SSW is completed, each disk device 1 transfers an SSW completion notification to the rack terminal RT via the port PT, the pallet I/F 102, the rack I/F 101, and the communication medium.

The rack terminal RT receives the SSW completion notification. This enables detection of the fact that the predetermined constituent unit does not have a failure, and enables appropriate manufacturing of each disk device 1 performed by the predetermined constituent unit.

In contrast, when a diagnosis result from at least one disk device 1 among the disk devices 1 of the predetermined constituent unit is NG, the rack terminal RT determines that the predetermined constituent unit has a failure (Yes in S13). The rack terminal RT skips S14 and S15, and stops manufacturing each disk device 1 of the predetermined constituent unit. This enables detection of a failure of the predetermined constituent unit, and enables avoidance of inappropriate manufacturing processing of the disk device 1 performed by the predetermined constituent unit.

As described above, in the embodiment, prior to the manufacture of the disk device 1 in the manufacturing rack RC, a failure of the predetermined constituent unit in the manufacturing rack RC is diagnosed. This enables the disk device 1 to be appropriately manufactured in the manufacturing rack RC. Therefore, performance of a BDW process in a rack environment in which power supply voltage abnormality occurs can be prevented without new capital investment. Alternatively, performance of the BDW process in a state where the rotation period of the SPM 11 is unstable can be prevented. Furthermore, the predetermined constituent unit having a problem can also be identified. Furthermore, this can reduce the need for manual wiring work and checking work thereof for checking a power supply voltage on the side of the manufacturing rack and additional external equipment and checking work thereof for measuring a rack vibration state.

For example, when introduction of equipment for constantly monitoring the power supply voltage and the vibration state on the side of the manufacturing rack is newly considered, a large equipment introduction cost occurs in a case where there are a large number (e.g., several hundreds) of manufacturing racks in a factory.

In contrast, according to the present embodiment, such additional equipment is unnecessary, and such an additional equipment introduction cost can also be inhibited.

Furthermore, when monitor equipment is added, maintenance therefor, replacement due to aging, and the like need to be considered.

In contrast, according to the present embodiment, the disk device 1 is replaced for each manufacture, so that such a problem can be avoided.

Furthermore, when the disk device 1 is manufactured in a manufacturing rack having a failure, a defective disk device may be manufactured.

In contrast, according to the present embodiment, the normal state of the manufacturing rack can be checked and the manufacturing process can be performed, so that the disk device 1 with good quality can be produced. Furthermore, the manufacturing rack can detect an abnormal state and stop the manufacturing process, so that production of a disk device having poor quality can be preliminarily stopped.

Furthermore, when there are a large number of manufacturing racks in a factory, identification of a manufacturing rack having a failure is difficult.

In contrast, according to the present embodiment, a manufacturing rack having a problem can be easily identified from a large number of manufacturing racks in a factory. Furthermore, a check therefor can be continuously made.

Note that, although, in the present embodiment, the failure diagnosis program and the BDW program have been described as different programs, the failure diagnosis program can be included in the BDW program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of manufacturing a disk device comprising:
    installing a disk device in a manufacturing rack and diagnosing, by the disk device, a failure of the manufacturing rack by a failure diagnosis method, the failure diagnosis method comprising:
        acquiring, by the disk device, data on a state of a predetermined constituent unit in the manufacturing rack with the disk device being installed in the manufacturing rack; and
        determining, by the disk device, whether or not the state of the predetermined constituent unit falls within an allowable range by using the data acquired; and
    manufacturing the disk device by using the manufacturing rack when the manufacturing rack has not failed.

2. The method of manufacturing a disk device according to claim 1 further comprising
    not manufacturing the disk device by using the manufacturing rack when the manufacturing rack has failed.

3. The method of manufacturing a disk device according to claim 1, wherein the manufacturing a disk device includes:
    writing an auxiliary servo pattern on a disk with the disk device including the disk being installed in the manufacturing rack; and
    writing a servo pattern corresponding to the auxiliary servo pattern on the disk with the disk device being installed in the manufacturing rack.

4. The method according to claim 1, wherein, the failure diagnosis method further including:
    determining, by a rack terminal that manages the manufacturing rack, that the predetermined constituent unit fails when the state of the predetermined constituent unit is out of an allowable range; and
    determining, by the rack terminal, that the predetermined constituent unit has not failed when the state of the predetermined constituent unit falls within the allowable range.

5. The method according to claim 1, wherein the acquiring data includes acquiring, by the disk device, data on a level of power supply from the manufacturing rack with the disk device being installed in the manufacturing rack.

6. The method according to claim 1, wherein
    the disk device includes a spindle motor, and
    the acquiring data includes acquiring, by the disk device, data on a rotation period of the spindle motor that is operated by power corresponding to power supply from the manufacturing rack with the disk device being installed in the manufacturing rack.

7. The method according to claim 1, wherein
plural disk devices are installed in the predetermined constituent unit, each of the plural disk devices being identical to the disk device,
the failure diagnosis method further including:
    determining that a state of the predetermined constituent unit is out of the allowable range when a state of at least one of the plural disk devices is out of an allowable range, a state of the predetermined constituent unit is; and
    determining that the state of the predetermined constituent unit falls within the allowable range when states of the plural disk devices fall within the allowable range.

8. The method according to claim 5, wherein
the disk device includes a spindle motor, and
the acquiring data further includes acquiring, by the disk device, data on a rotation period of the spindle motor that is operated by power corresponding to power supply from the manufacturing rack with the disk device being installed in the manufacturing rack.

9. The method according to claim 5, wherein
the determining by the disk device includes determining whether or not the level of power supply falls between an upper limit value and a lower limit value of an allowable range of the level of power supply.

10. The method according to claim 6, wherein
the determining by the disk device includes determining whether or not the rotation period falls between an upper limit value and a lower limit value of an allowable range of the rotation period.

11. The method according to claim 8, wherein the disk device determining includes:
    determining whether or not the level of power supply falls between an upper limit value and a lower limit value of an allowable range of the level of power supply; and
    determining whether or not the rotation period falls between an upper limit value and a lower limit value of an allowable range of the rotation period.

12. The method according to claim 1, wherein the predetermined constituent unit includes a whole of the manufacturing rack.

13. The method according to claim 1, wherein
the manufacturing rack includes plural pallets,
the disk device is provided in each of the plurality of pallets, and
the predetermined constituent unit includes the pallet.

14. The method according to claim 1, wherein
the manufacturing rack includes plural pallets,
each of the plurality of pallets includes plural ports,
the disk device is connected to each of the plurality of ports, and
the predetermined constituent unit includes each of the ports.

15. The method according to claim 4, wherein
the manufacturing rack includes:
    a rack interface to which the rack terminal is allowed to be connected; and
    plural pallets each connected to the rack interface, the disk device is installed in each of the plurality of pallets, and
the predetermined constituent unit includes the pallet.

16. The failure diagnosis method according to claim 4, wherein
the manufacturing rack includes:
    a rack interface to which the rack terminal is allowed to be connected; and
    plural pallets each connected to the rack interface,
each of the plurality of pallets includes plural ports,
the disk device is connected to each of the plurality of ports, and
the predetermined constituent unit includes each of the ports.

17. The method according to claim 4, wherein
plural disk devices are installed in the predetermined constituent unit, each of the plural disk devices being identical to the disk device, and
the failure diagnosis method further includes:
    acquiring, by the rack terminal, a determination result from the plurality of disk devices;
    determining, by the rack terminal, that a state of the predetermined constituent unit is out of an allowable range when a state of at least one of the plural disk devices are out of the allowable range; and
    determining, by the rack terminal, that the state of the predetermined constituent unit falls within the allowable range when states of the plural disk devices fall within the allowable range in accordance with the determination result from the plurality of disk devices.

18. A method of manufacturing a disk device comprising:
installing a disk device in a manufacturing rack and diagnosing, by the disk device, a failure of the manufacturing rack, using a non-transitory computer readable recording medium having a failure diagnosis program, the failure diagnosis program causing a computer to perform:
    acquiring, by the disk device, data on a state of a predetermined constituent unit in the manufacturing rack with the disk device being installed in the manufacturing rack; and
    determining, by the disk device, whether or not the state of the predetermined constituent unit falls within an allowable range by using the data acquired; and
manufacturing the disk device by using the manufacturing rack when the manufacturing rack has not failed.

19. The method according to claim 18, wherein
the failure diagnosis program causes the computer to further perform:
    determining that the predetermined constituent unit has failed when the state of the predetermined constituent unit is out of an allowable range; and
    determining that the predetermined constituent unit has not failed when the state of the predetermined constituent unit falls within the allowable range.

* * * * *